(12) United States Patent
Dimitri et al.

(10) Patent No.: US 7,212,470 B2
(45) Date of Patent: May 1, 2007

(54) METHOD AND APPARATUS TO TRANSFER INFORMATION BETWEEN A HOST COMPUTER AND ONE OR MORE HARD DISKS DISPOSED IN A DATA STORAGE AND RETRIEVAL SYSTEM

(75) Inventors: Kamal Emile Dimitri, Tucson, AZ (US); Robert George Emberty, Tucson, AZ (US); Craig Anthony Klein, Tucson, AZ (US); Daniel James Winarski, Tucson, AZ (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 1188 days.

(21) Appl. No.: 09/878,470

(22) Filed: Jun. 11, 2001

(65) Prior Publication Data

US 2002/0186641 A1 Dec. 12, 2002

(51) Int. Cl.
*G06F 1/16* (2006.01)
*G06F 1/18* (2006.01)

(52) U.S. Cl. .............. 369/30.2; 369/30.28; 713/300; 361/685

(58) Field of Classification Search ............. 713/300; 369/30.2, 30.28; 361/685
See application file for complete search history.

(56) References Cited

U.S. PATENT DOCUMENTS

| | | | | |
|---|---|---|---|---|
| 5,606,467 | A | | 2/1997 | Hirata ................. 360/69 |
| 5,611,066 | A | | 3/1997 | Keele et al. ............ 395/427 |
| 5,793,714 | A | | 8/1998 | Inoue et al. ............ 369/30 |
| 5,970,030 | A | * | 10/1999 | Dimitri et al. ......... 369/30.46 |
| 6,018,456 | A | * | 1/2000 | Young et al. ........... 361/684 |
| 6,038,490 | A | | 3/2000 | Dimitri et al. ......... 700/214 |
| 6,115,331 | A | | 9/2000 | Inoue et al. ........... 369/34 |
| 6,693,859 | B1 | * | 2/2004 | Kulakowski et al. ..... 369/30.34 |
| 6,826,004 | B2 | * | 11/2004 | Albrecht et al. ......... 360/69 |

OTHER PUBLICATIONS

IBM Technical Disclosure Bulletin, "Semiconductor Volume of Contents for Data Cartridges", Jan. 1998, vol. 37, No. 1, p. 207.
IBM Technical Disclosure Bulletin, "Exploitation of Mount Caching for an Automated Tape Library", Aug. 1992, vol. 35, No. 3, pp. 432-433.

* cited by examiner

*Primary Examiner*—James K. Trujillo
*Assistant Examiner*—Eric Chang
(74) *Attorney, Agent, or Firm*—Dale F. Reglman; Chandler & Udall, LLP

(57) ABSTRACT

An accessor moveably disposed within a data storage and retrieval system, where that accessor includes an information input/output device and a power supply connector disposed on a gripper mechanism such that the information input/output device and the power supply connector can be releaseably coupled/connected to an information input/output port and a power port, respectively, disposed on a hard disk drive unit disposed in a storage slot within the data storage and retrieval system. A data storage and retrieval system which includes one or more of Applicants' accessors, one or more hard disk disposed in one or more hard disk drive units each of which includes an information input/output port in communication with that hard disk, and an information transfer station in communication with a host computer, wherein that information transfer station can communicate with Applicants' accessor(s).

A method to transfer information between one or more hard disks disposed in Applicants' data storage and retrieval system and a host computer using a memory device disposed on one or more accessors moveably disposed within Applicants' data storage and retrieval system. Applicants' data storage and retrieval system includes computer useable medium having computer readable program code disposed therein, where that computer readable program code comprises a series of computer readable program steps to implement Applicants' method.

13 Claims, 14 Drawing Sheets

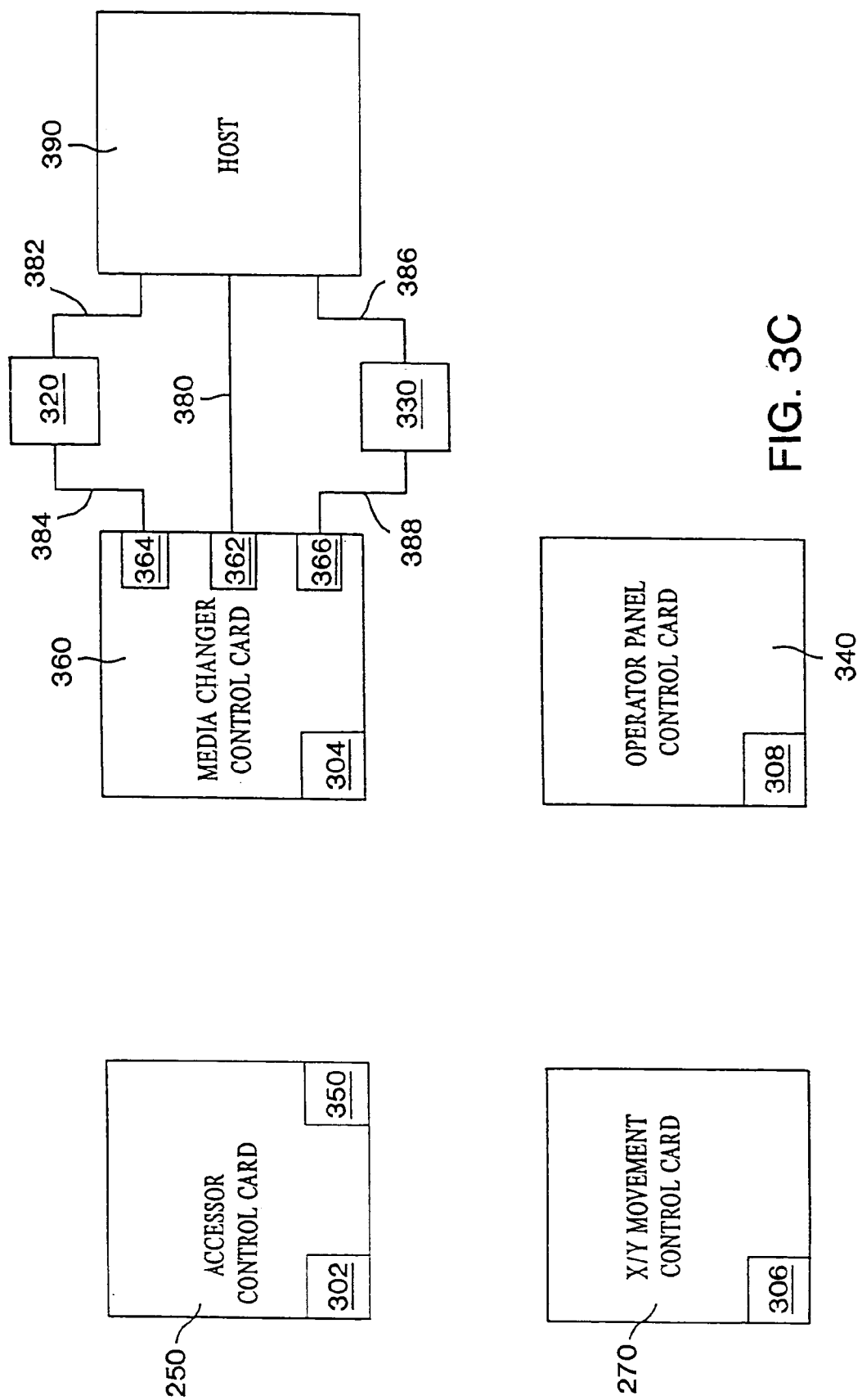

METHOD AND APPARATUS TO TRANSFER INFORMATION BETWEEN A HOST COMPUTER AND ONE OR MORE HARD DISKS DISPOSED IN A DATA STORAGE AND RETRIEVAL SYSTEM

FIELD OF THE INVENTION

Applicant's invention relates to an apparatus and method to transfer information between an external host computer and one or more hard disks disposed in Applicants' data storage and retrieval system.

BACKGROUND OF THE INVENTION

Automated media storage libraries are known for providing cost effective access to large quantities of stored media. Generally, media storage libraries include a large number of storage slots on which are stored data storage media. Such data storage media may include one or more hard disks disposed in one or more hard disk drive units. One (or more) accessor typically accesses the hard disk drive units, and transports those units to a facility wherein information can be read from, or written to, the hard disks disposed in those hard disk drive units. Suitable electronics operate the accessor(s) and operate the data storage and retrieve system in order to transmit data to, and/or to receive data from, an attached on-line host computer system.

What is needed, however, is an apparatus and method that allows an accessor to transfer information from/to a host computer and to/from one or more hard disks disposed within a data information and retrieval system without removing the hard disk drive units containing those hard disks from their respective storage slots.

SUMMARY OF THE INVENTION

Applicant's invention includes a memory accessor moveably disposed within a data storage and retrieval system, where that data storage and retrieval system includes one or more hard disk drive units comprising a hard disk, a read/write head, and an information input/output port in communication with the read/write head. Applicants' accessor includes a memory device, an information input/output device connected to that memory device, where that information input/output device can be releaseably coupled to the information input/output port disposed on one or more of the one or more hard disk drive units such that information can be exchanged between the hard disk disposed in that hard disk drive unit and the memory device disposed on that accessor.

Applicants' invention further includes a data storage and retrieval system, which includes a host computer, an information transfer station which includes a transfer station information input/output port in communication with the host computer, one or more storage slots, one or more hard disk drive units removeably disposed in these storage slots. Each such hard disk drive unit comprises a hard disk, a read/write head, and a information input/output port in communication with that read/write head.

Applicants' invention further includes a method to transfer designated information having a file size between a host computer and one or more hard disks disposed in one or more hard disk drive units removeably disposed within Applicants' data storage and retrieval system. Applicants' method includes the steps of transporting the hard disk drive unit to the information transfer station if the file size of the designated information is greater than the storage capacity of the memory device disposed on Applicants' memory accessor, or transferring the designated information between the host computer and the hard disk using Applicants' memory accessor if the file size of that designated information is not greater than the storage capacity of that memory device.

Applicants' data storage and retrieval system further includes a computer useable medium having computer readable program code disposed therein for implementing Applicants' method to transfer designated information between a host computer and one or more hard disks disposed in one or more hard disk drive units removeably disposed within Applicants' data storage and retrieval system.

BRIEF DESCRIPTION OF THE DRAWINGS

The invention will be better understood from a reading of the following detailed description taken in conjunction with the drawings in which like reference designators are used to designate like elements, and in which:

FIG. 3C is a schematic showing a third embodiment of Applicants' distributed control network used in certain embodiments of Applicants' data storage and retrieval system;

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment.

Figure 1:
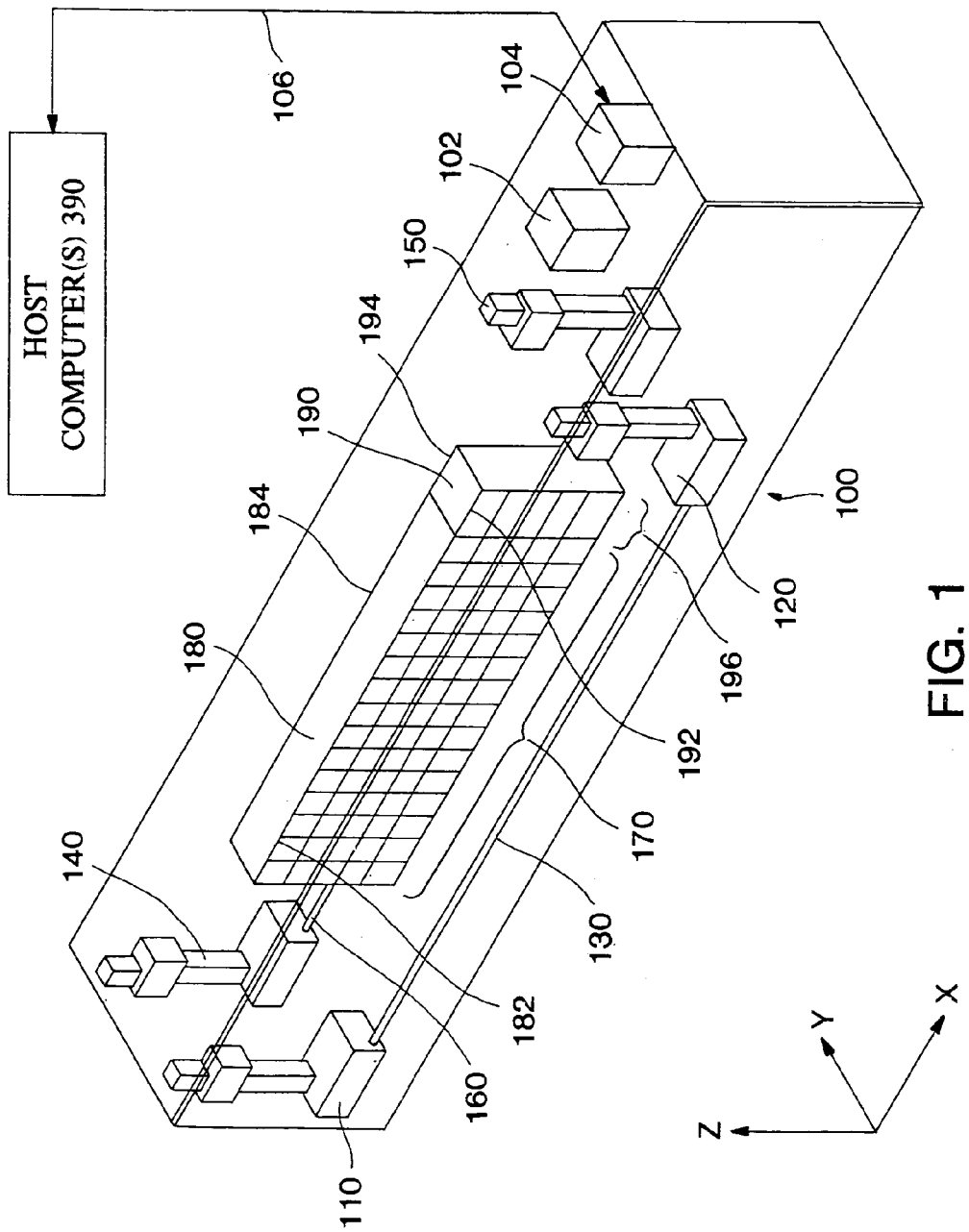
FIG. 1 is a perspective view of Applicant's data storage and retrieval system.

Referring to FIG. 1, Applicant's automated data storage and retrieval system 100 includes a plurality of storage slots 170 disposed in storage wall 180. Storage wall 180 includes first side 182 and second side 184. Each of the plurality of storage slots 170 includes a first open end disposed in first side 182 and a second open end disposed in second side 184. System 100 further includes information transfer station 190 which includes a plurality of information transfer slots 196. Information transfer station 190 includes first side 192 and second side 194. Each of the plurality of information transfer slots 196 includes a first open end disposed in first side 192 and a second open end disposed in second side 194.

Applicant's automated data storage and retrieval system 100 includes one or more accessors, such as accessors 110, 120, 140, and 150. Transport accessors 110 and 120 are moveably disposed on rail system 130. Rail system 130 is disposed adjacent first sides 182 and 192. Transport accessors 110 and 120 comprise robotic devices which access hard disk drive units disposed in storage wall 180. Accessor 110/120 then delivers such an accessed hard disk drive unit to one of the plurality of information transfer slots 196 for reading and/or writing data on the hard disk internally disposed within that hard disk drive unit, and returns the hard disk drive unit to its designated storage slot.

Accessor 140 and accessor 150 comprise memory accessors. Accessors 140 and 150 access hard disk drive units disposed in storage wall 180 and read and/or write information to the hard disks internally disposed within those hard disk drive units while those hard disk drive units remain disposed in their individual storage slots. Accessors 140 and 150 are movably disposed on rail system 160. Rail system 160 is disposed adjacent second side 184 and second side 194.

As shown in FIG. 1, transport accessors 110 and 120 are both moveably disposed on rail system 130. Similarly, memory accessors 140 and 150 are both moveably disposed on rail system 160. U.S. Pat. No. 6,038,490, entitled "Automated Data Storage Dual Picker Interference Avoidance, teaches a method to prevent collisions occurring between accessors moveably disposed on the same rail system, and is hereby incorporated by reference herein.

Operator input station 102 permits a user to communicate with Applicant's automated data storage and retrieval system 100. One or more power supply units (not shown in FIG. 1) supply power to accessors 110, 120, 140, and 150, and to each of the plurality of information transfer slots 196, via one or more power buses (not shown in FIG. 1).

In certain embodiments, data storage and retrieval system 100 includes library controller 104. Library controller 104 controls the operation of, among other things, accessors 110, 120, 140, and 150. Library controller 104 communicates with one or more external host computer(s) 390 (FIG. 3) via communication link 106. Communication link 106 is selected from the group comprising an RS-232 cable, a SCSI interconnection, a Gigabit Ethernet interconnection, a Fibre Channel interconnection, a local area network, a private wide area network, a public wide area network, and combinations thereof.

Figure 2:
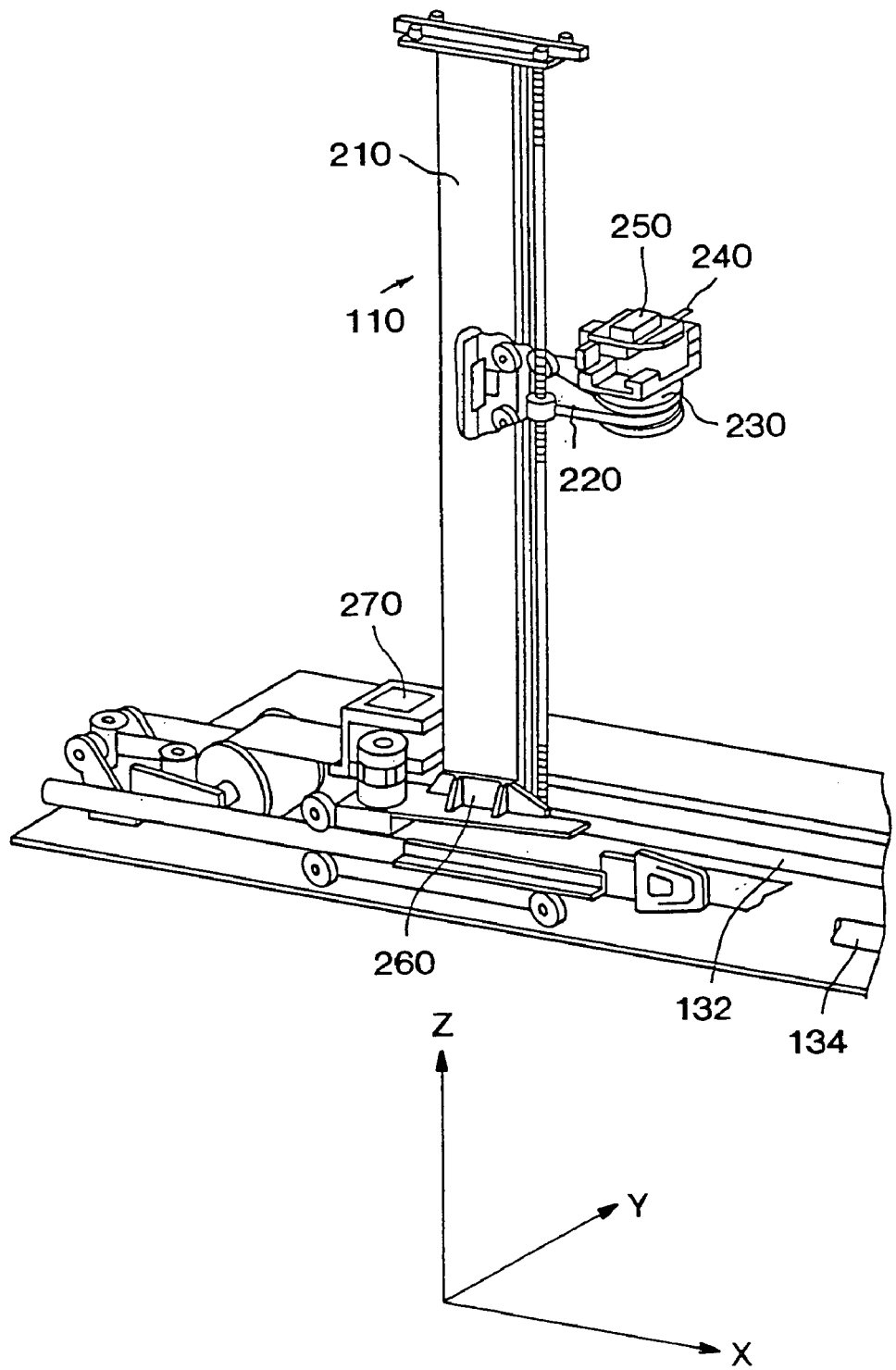
FIG. 2 is a perspective view of Applicants' accessor moveably disposed in Applicants' data storage and retrieval system.

Referring now to FIG. 2, rail system 130 is shown including two parallel rails, i.e. first rail 132 and second rail 134. Accessor 110 includes vertical pillar 210 which connects to carriage assembly 260. Lifting servo section 220 moves vertically along pillar 210. In the embodiment shown in FIG. 2, accessor 110 includes gripper mechanism 230. In certain embodiments, accessors 110 and 120 include a single gripper mechanism 230. In alternative embodiments, accessor 110 and/or accessor 120 includes a second gripper mechanism 230.

Figure 5:
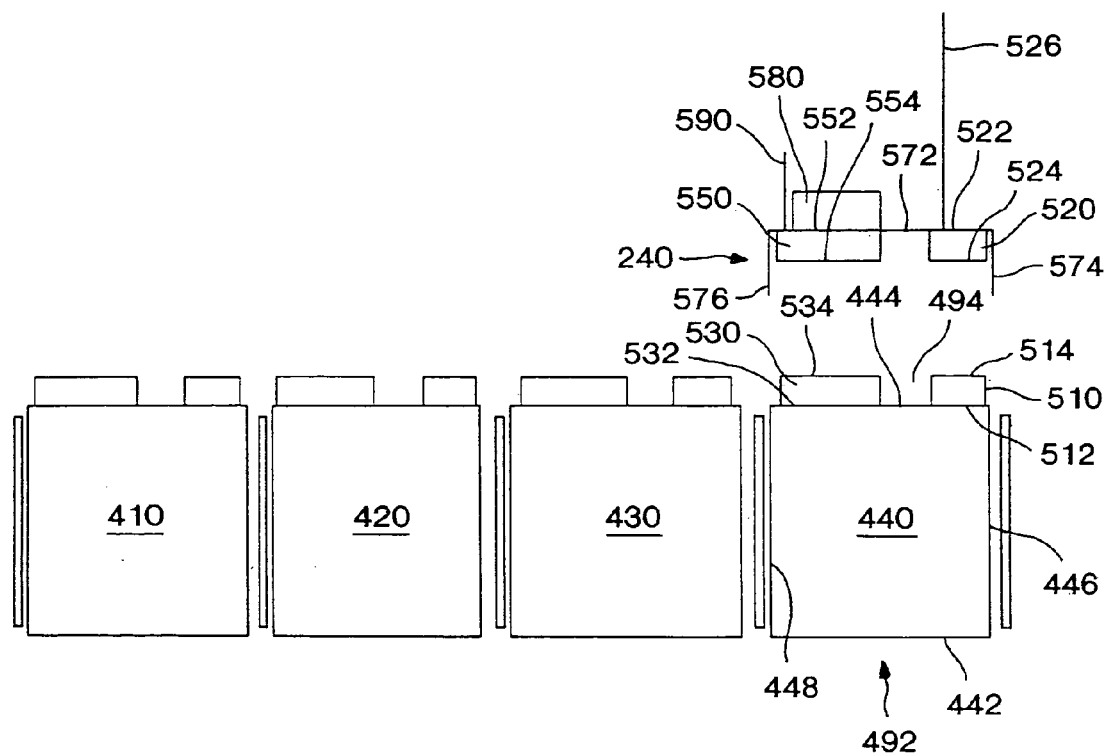
FIG. 5 is a top view showing the gripper mechanism disposed on Applicants' memory accessor releaseably attached to a hard disk disposed in Applicants' data storage and retrieval system.

Accessors 140 and 150 include gripper mechanism 240. Gripper mechanism includes information input/output device 550 (FIG. 5) and power supply connector 520 (FIG. 5). In certain embodiments, accessor 140 and/or accessor 150 also include one or more gripper mechanisms 230. In certain embodiments, one or more accessors include both a gripper mechanism 230 and a gripper mechanism 240. Such accessors comprise both a transport accessor and a memory accessor.

As discussed above, in certain embodiments, library controller 104 (FIG. 1) controls the operation of accessors 110, 120, 140, and 150. In other embodiments of Applicants' data storage and retrieval system, a distributed control network is employed. In these distributed control embodiments, lifting servo section 220 includes accessor control card 250, and carriage assembly 260 includes X/Y movement control card 270.

Figure 3A:
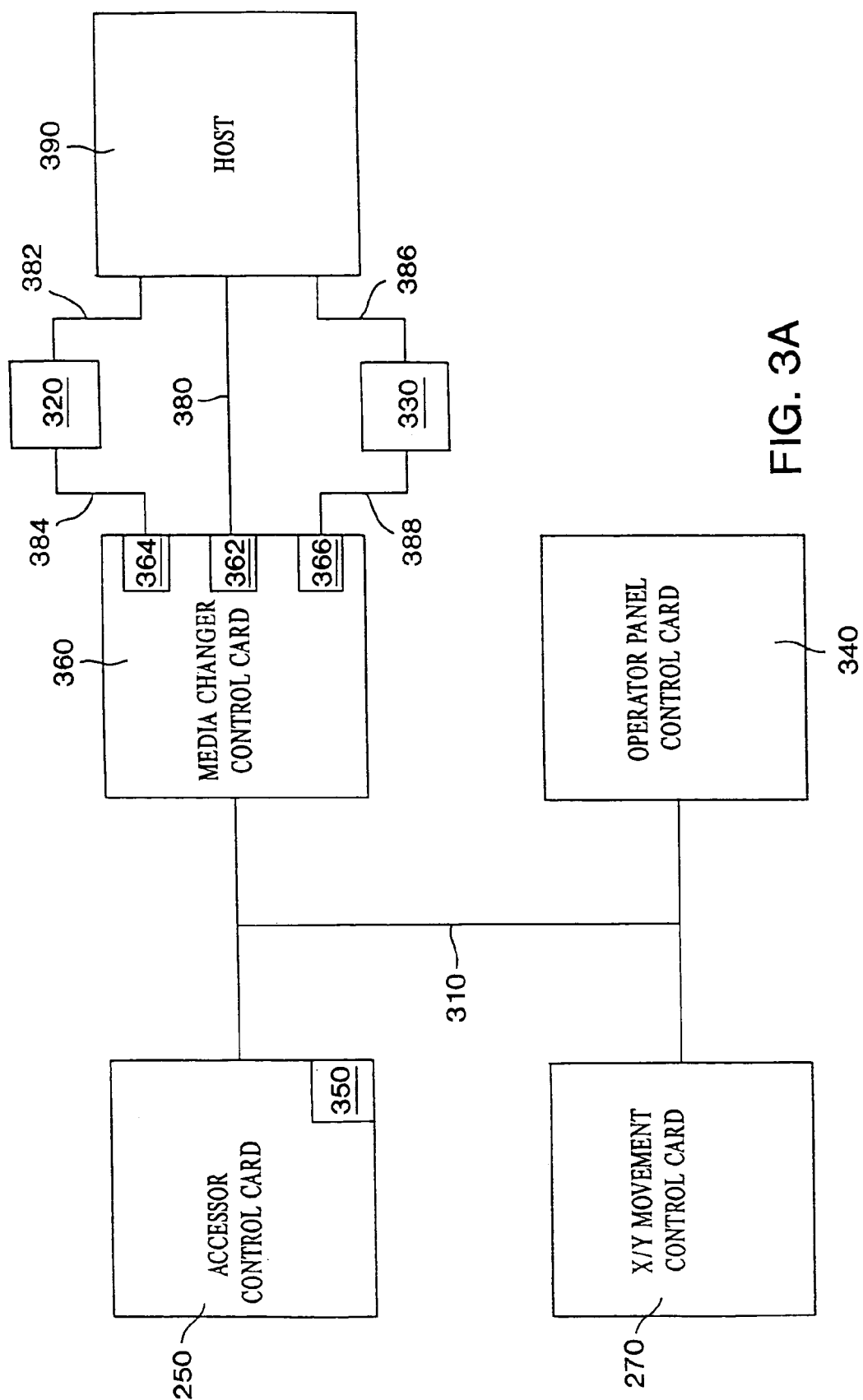
FIG. 3A is a schematic showing a first embodiment of Applicants' distributed control network used in certain embodiments of Applicants' data storage and retrieval system.

Referring to FIG. 3A, a first embodiment of Applicants' distributed control network includes accessor control card 250 (FIG. 2), X/Y movement control card 270 (FIG. 2), media changer control card 360, and operator panel control card 340. Communication bus 310 disposed within Applicants' automated data storage and retrieval system provides a communication link between these control cards. In certain embodiments of Applicants' invention bus 310 comprises an ethernet bus. In other embodiments, bus comprises a Can-BUS bus.

In certain embodiments, accessor control card 250 includes memory device 350. Memory device 350 is selected from the group comprising a hard disk/hard disk drive combination, a floppy disk/floppy disk drive combination, an optical disk/optical disk drive combination, an IBM Microdrive, a PCMCIA miniature storage drive such as manufactured by Calluna, and solid state nonvolatile memory devices including an erasable programmable read-only memory (EPROM), an electrically erasable programmable read-only memory (EEPROM), battery backup RAM, and the like. Operator panel control card 340 is disposed within operator control panel 102 (FIG. 1). Media changer control card 362 is disposed within information transfer station 190 (FIG. 1).

Host computer 390 communicates with backplane 320 via communication link 382, and with backplane 330 via communication link 386. Communication link 384 connects backplane 320 and media changer control card 360 through interface 364. Communication link 388 connects backplane 330 and media changer control card 360 through interface 366. Communication links 380, 382, 384, 386, and 388, are selected from the group comprising an RS-232 cable, a SCSI interconnection, a Fibre Channel interconnection, a local area network, a private wide area network, a public wide area network, and combinations thereof.

In certain embodiments, host computer 390 also communicates with media changer control card 360 via communication link 380 and interface 362. As those skilled in the art will appreciate, communication link 380 and interface 362 provide a control path into Applicants' data storage and retrieval system.

Figure 3B:
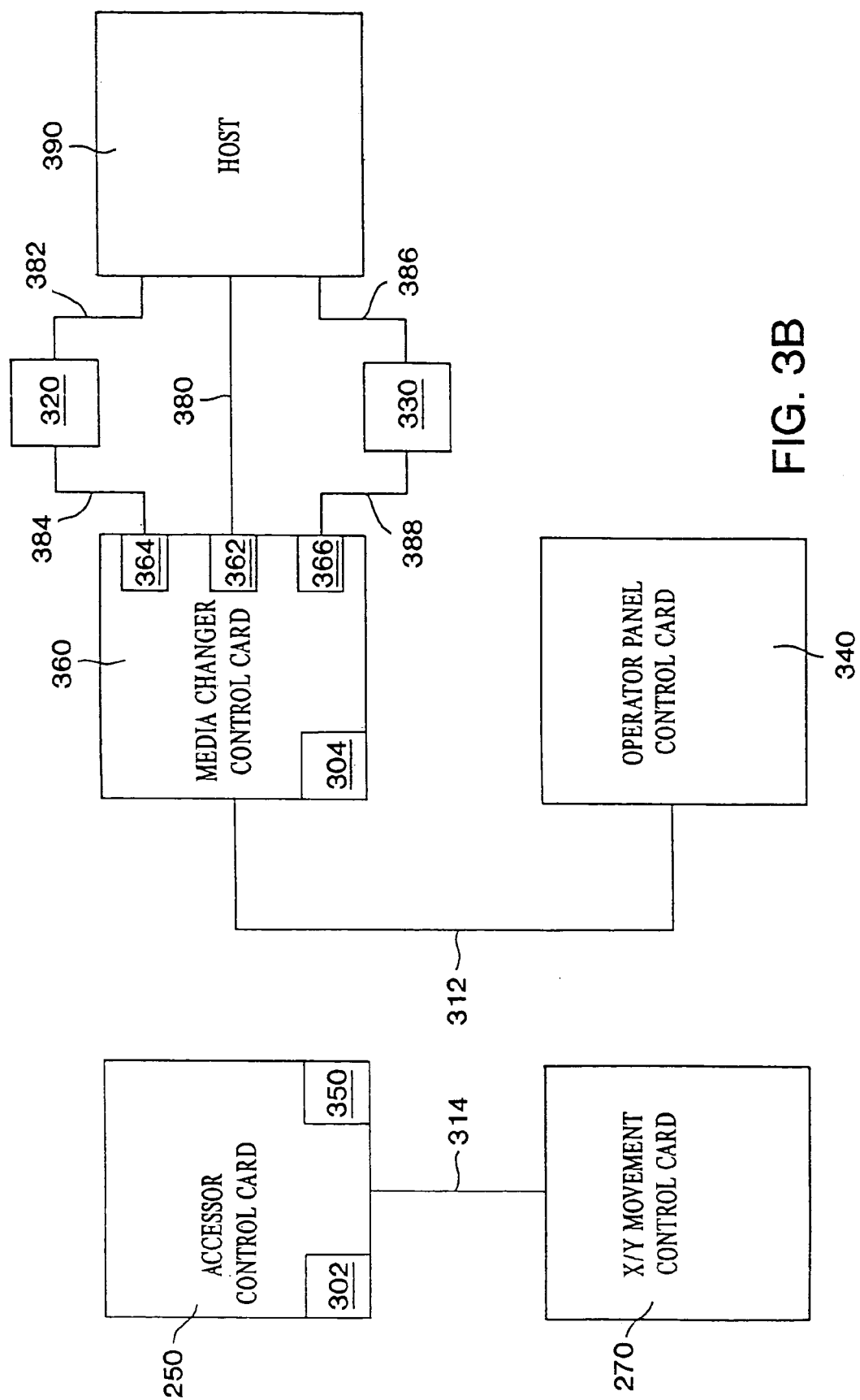
FIG. 3B is a schematic showing a second embodiment of Applicants' distributed control network used in certain embodiments of Applicants' data storage and retrieval system.

FIG. 3B shows an alternative embodiment of Applicant's distributed control network. Accessor control card 250 includes wireless communication device 302. Media changer control card 360 includes wireless communication device 304. Communication link 314 interconnects accessor control card 250 and X/Y control card 270. Communication link 312 interconnects operator panel control card 340 and media changer control card 360. In certain embodiments, buses 312 and 314 comprise ethernet interconnections, CANbus interconnections, and combinations thereof.

In this embodiment, media changer control card 360/operator panel control card 340 communicate with accessor control card 250 and/or X/Y movement control card 270 via wireless communication using wireless communication devices 302 and 304. Such wireless communication employs emissions in the infrared spectrum, emissions in the visible light spectrum, frequencies from about 1 MHz to about 10 GHz, and combinations thereof.

FIG. 3C shows a second alternative embodiment of Applicant's distributed control network. In this embodiment, accessor control card 250 includes wireless communication device 302, media changer control card 360 includes wireless communication device 304, X/Y movement control card 270 includes wireless communication device 306, and operator panel control card 340 includes wireless communication device 308. In this embodiment, the nodes in Applicant's distributed control network communicate with one another by wireless communication. Such wireless communication employs emissions in the infrared spectrum, emissions in the visible light spectrum, frequencies from about 1 MHz to about 10 GHz, and combinations thereof.

Figure 4:
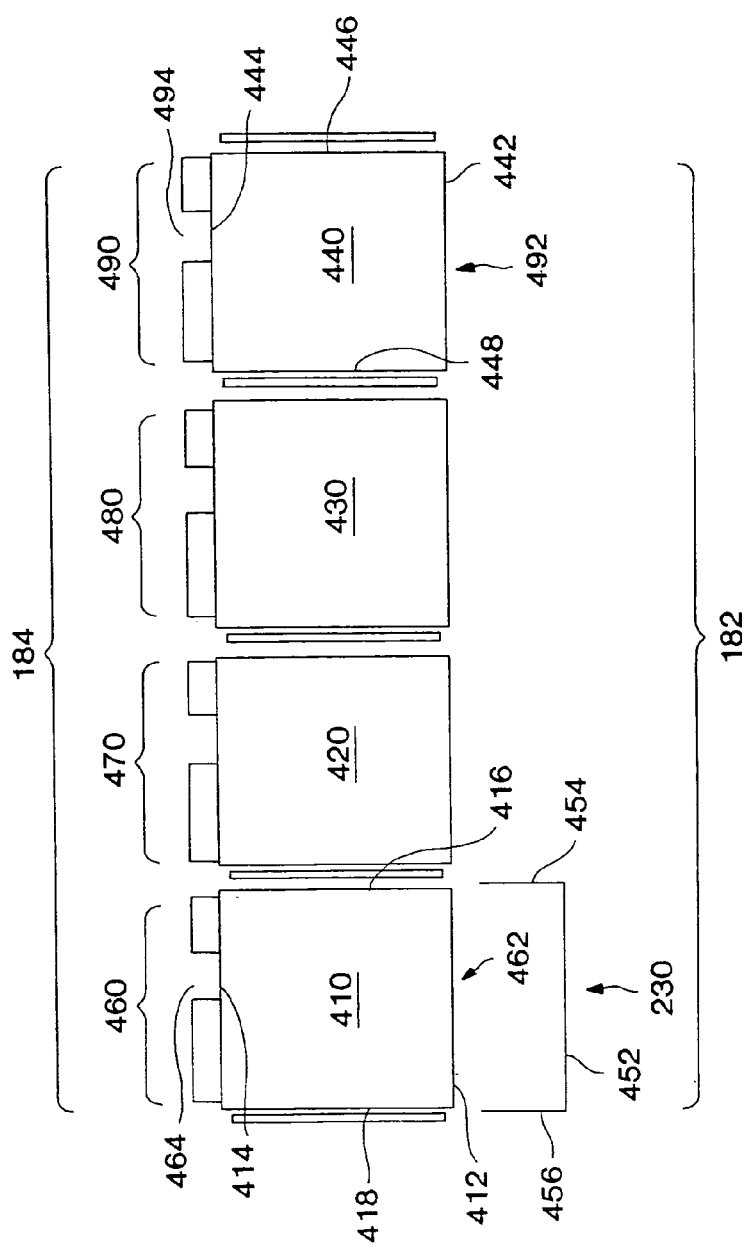
FIG. 4 is top view showing the gripper mechanism disposed on Applicants' transport accessor releaseably attached a hard disk drive disposed in Applicants' data storage and retrieval system.
Figure 4:
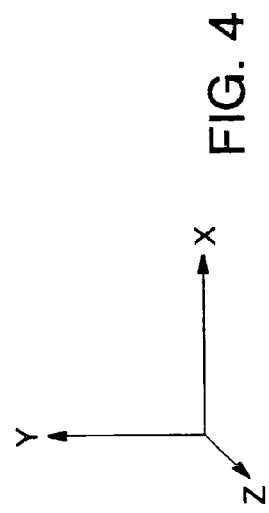

FIG. 4 shows hard disk drive units 410, 420, 430, and 440 disposed in storage slots 460, 470, 480, and 490, respectively. Hard disk drive unit 410 includes first end 412, opposing second end 414, first side 416, and opposing second side 418. Storage slot 460 includes first open end 462 and second open end 464. First open end 462 is disposed in side 182 (FIG. 1) of storage wall 180 (FIG. 1). Second open end 464 is disposed in side 184 (FIG. 1) of storage wall 180. First end 412 of hard disk drive unit 410 faces outwardly from first open end 462. Second end 414 of unit 410 faces outwardly from second open end 464.

Referring again to FIG. 1, accessors 110 and 120 are moveably disposed on rail system 130 which is disposed adjacent side 182 of storage wall 180. Referring again to FIG. 2, gripper mechanism 230 is disposed on lifting servo section 220 of accessor 110. FIG. 4 shows gripper mechanism 230 (FIG. 2) disposed on accessor 110 (FIGS. 1, 2). Gripper mechanism 230 includes first gripper arm 454, second gripper arm 456, and member 452. Arms 454 and 456 are pivotably attached to, and extend outwardly from, the two ends of member 452.

In order to remove hard disk drive unit 410 from storage slot 460, accessor 110 is first positioned in the X direction along rail system 130 adjacent the column of storage slots which includes storage slot 460. Simultaneous with the X direction motion, lifting servo section 220 is moved in the Z direction until gripper mechanism 230 is disposed adjacent first end 412 of hard disk drive unit 410. Gripper mechanism 230 is then advanced in the +Y direction until first arm 454 is disposed along side 416, second arm 456 is disposed along side 418, and member 452 is disposed adjacent first end 412. The distal end of arm 454 is then pivoted in the −X direction and the distal end of arm 456 is pivoted in the +X direction to releaseably fixture hard disk drive unit 410 to gripper mechanism 230. Gripper mechanism 230 is then retracted in the −Y direction to extract hard disk drive unit 410 from storage slot 460. Accessor 110 then transports releaseably attached hard disk drive unit 410 to information transfer station 190 (FIG. 1).

Figure 6:
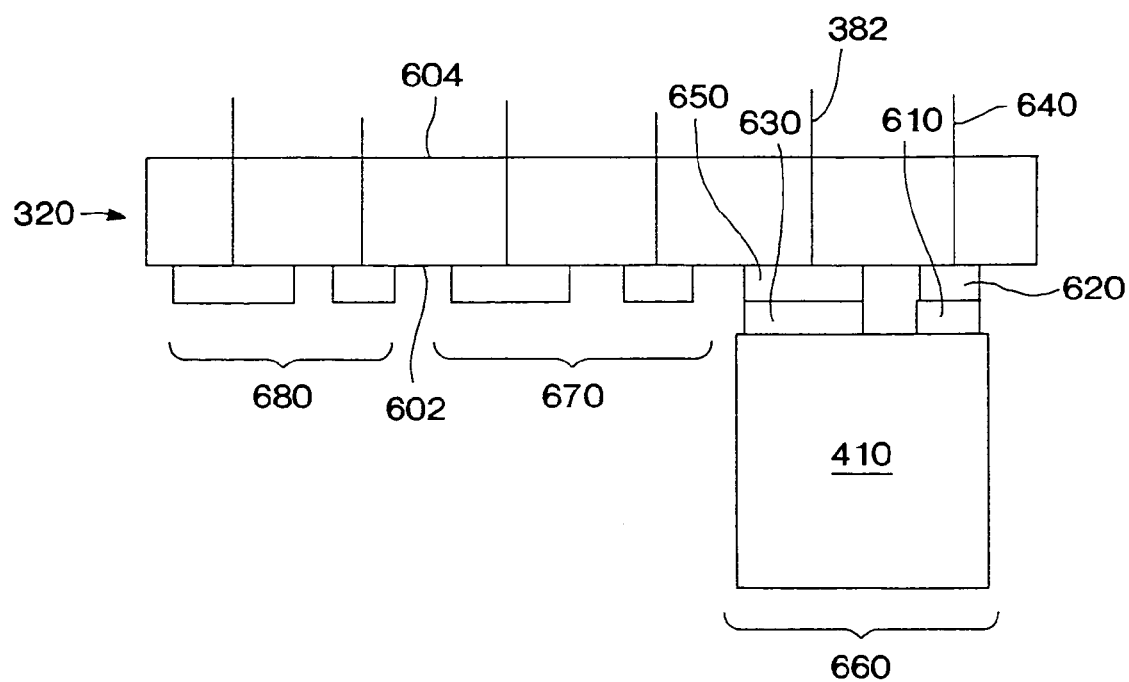
FIG. 6 shows a top view of a hard disk releaseably coupled to a first docking position disposed in the information transfer station disposed in Applicants' data storage and retrieval system.
Figure 6:
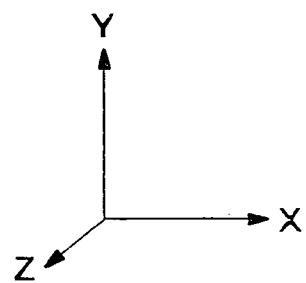

FIG. 6 shows backplane unit 320 (FIG. 3). Backplane unit 320 is disposed in one or more of the information transfer slots 196 (FIG. 1) disposed in information transfer station 190 (FIG. 1). Backplane 320 includes first side 602 and second side 604. Backplane 320 is disposed in an information transfer slot such that first side 602 faces outwardly from that slot in the direction of first side 192 of information transfer station 190. Backplane unit 320 includes docking position 660, docking position 670, and docking position 680.

Hard disk drive unit 410 is shown releaseably coupled to backplane unit 320 at docking position 660. Hard disk drive unit 410 includes hard disk 415 (not shown in FIGS.) and read/write head 417 (not shown in FIGS.) disposed internally therein. Hard disk drive unit further includes information input/output port 630 disposed on end 414 (FIG. 4) and power port 610 disposed on end 414. Information input/output port 630 communicates with read/write head 417. Power port 610 supplies power to the various components disposed in hard disk drive unit 410.

Docking position 660 includes information input/output device 650 and power supply connector 620. Information input/output device 650 communicates with host computer 390 (FIGS. 3A, 3B, 3C) via communication link 382 (FIGS. 3A, 3B, 3C). Power supply connector 620 receives power from power bus 640.

As shown in FIG. 6, hard disk drive unit 410 releaseably couples to docking position 660 such that information input/output device 650 releaseably mates with information input/output port 630, and such that power supply connector 620 releaseably mates with power port 610.

In certain embodiments, information input/output port 630 includes one or more input/output terminals 635 (not shown in FIG. 4). In this embodiment, information input/output device 650 releaseably connects to those input/output terminals thereby allowing the transfer of information. U.S. Pat. No. 5,606,467 describes such an interconnection between input/output terminals and an information reading device, and is hereby incorporated by reference.

In alternative embodiments, the interface between information input/output device 650 and information input/output port 630 comprises a contactless interface. In certain embodiments, such a contactless interface comprises a contactless radio frequency interface. In these radio frequency interface embodiments, information input/output device 650 generates an operating field. This operating field is modulated by both information input/output device 650 and information input/output port 630 to enable contactless communication between device 650 and port 630.

In one embodiment, the operating field has a frequency of about 13,560 kHz±7 kHz. The minimum field strength is about 5 A/m and the maximum field strength is about 15 A/m. Information input/output device 650 communicates with information input/output port 630 by amplitude modulating this operating field. Information input/output port 630 communicates with information input/output device 650 by load modulating the operating field with a subcarrier having a subcarrier frequency equal to about fc/16. As those skilled in the art will appreciate, load modulation is the process of amplitude modulating a radio frequency field by varying the properties of a resonant circuit placed within the radio frequency field.

When gripper mechanism 230 positions releaseably attached hard disk drive unit 410 such that information input/output device 650 is disposed adjacent information input/output port 630 such that information can be transferred between hard disk 445 and memory device 580/350, power supply connector 620 releaseably connects to power port 610. Power supply connector 610 comprises a module plug-in connector, and power port 620 comprises a backplane plug-in connector. Electrical contact between the connectors 610 and 620, and thus between hard disk drive unit 440 and accessor 110/120, is effected when connector 620 is releaseably connected to power port 610. In certain embodiments of Applicants' invention, connector 620 has a "male" configuration and port 610 has a "female" configuration. In other embodiments, connector 620 has a "female" configuration and port 610 has a "male" configuration.

When hard disk drive unit 410 is releaseably coupled to docking position 660, information can be provided from host computer 390 (FIGS. 3A, 3B, 3C) to hard disk 445 via communication link 382 (FIG. 3), information input/output device 650, information input/output port 630, and read/write head 417. Similarly, information can be provided from hard disk 415 to host computer 390 via read/write head 417, information input/output port 630, information input/output device 650, and communication link 382.

In FIGS. 4 and 5, hard disk drive unit 440 (FIG. 4) is shown disposed in storage slot 490. Hard disk drive unit 440 includes first end 442, opposing second end 444, first side 446, and opposing second side 448. Storage slot 490 includes first open end 492 and second open end 494. First open end 492 is disposed in side 182 (FIG. 1) of storage wall 180 (FIG. 1). Second open end 494 is disposed in side 184 of storage wall 180. First end 442 of hard disk drive unit 440 faces outwardly from first open end 492. Second end 444 of unit 440 faces outwardly from second open end 494.

Referring again to FIG. 1, memory accessors 140 and 150 are moveably disposed on rail system 160 which is disposed adjacent side 184 of storage wall 180. Referring again to FIG. 2, gripper mechanism 240 is disposed on lifting servo section 220. FIG. 5 shows gripper mechanism 240 (FIG. 2) disposed on accessors 140 (FIG. 1) and 150 (FIG. 1). Gripper mechanism 240 includes member 572. In certain embodiments, gripper mechanism 240 also includes gripping arms 574 and 576. In these embodiments, arms 574 and 576 are pivotably attached to, and extend outwardly from, the respective ends of member 572. Member 572 in combination with arm 575 and arm 576 forms a U-shaped structure.

Gripper mechanism 240 further includes information input/output device 550 and power supply connector 520. Information input/output device 550 includes first side 552 and second side 554. In the embodiment shown in FIG. 5, first side 552 is disposed on member 572 and second side 554 extends outwardly from member 572 toward the open end of U-shaped structure 240. Power supply connector 520 includes first side 522 and second side 524. In the embodiment shown in FIG. 5, first side 522 is disposed on member 572 with second side 524 extending outwardly from member 572 toward the open end of U-shaped structure 240. Power bus 526 supplies power to power connector 520.

In certain embodiments, gripper mechanism 240 includes memory device 580 in communication with information input/output device 550. Memory device 580 is selected from the group comprising a hard disk/hard disk drive combination, a floppy disk/floppy disk drive combination, an optical disk/optical disk drive combination, an IBM Microdrive, a PCMCIA miniature storage drive such as manufactured by Calluna, and solid state nonvolatile memory devices including an erasable programmable read-only memory (EPROM), an electrically erasable programmable read-only memory (EEPROM), battery backup RAM, and the like. In other embodiments, communication link 590 connects information input/output device 550 and memory device 350 (FIGS. 3A, 3B, 3C) disposed on accessor control card 250 (FIGS. 2, 3A, 3B, 3C).

Hard disk drive unit 440 includes hard disk 445 (not shown in FIG. 5) and read/write head 447 (not shown in FIG. 5) internally disposed therein. Hard disk drive unit 440 further includes information input/output port 530 and power connector 510 disposed on end 444. Information input/output port 530 communicates with read/write head 447. Information input/output port 530 includes first side 532 and second side 534. First side 532 is disposed on second end 444 of hard disk drive unit 440 with second side 534 extending outwardly from second end 444. Power port 510 includes first side 512 and second side 514. Side 512 is disposed on second end 444 of hard disk drive unit 440 with second side 514 extending outwardly from second end 444.

In order to transfer information between memory device 580/350 and hard disk 445 while hard disk drive unit 440 remains disposed in storage slot 490, gripper mechanism 240 is positioned such that information input/output device 550 is releaseably coupled to input/output port 530, and such that power supply connector 520 is releaseably coupled to power port 510. The interface between information input/output device 550 and information input/output port 530 is formed as described above with respect to the interface between information input/output device 650 and information input/output port 630. The interface between power connector 520 and power port 510 is formed as described above with respect to the interface between power connector 620 and power port 610.

Figure 7:
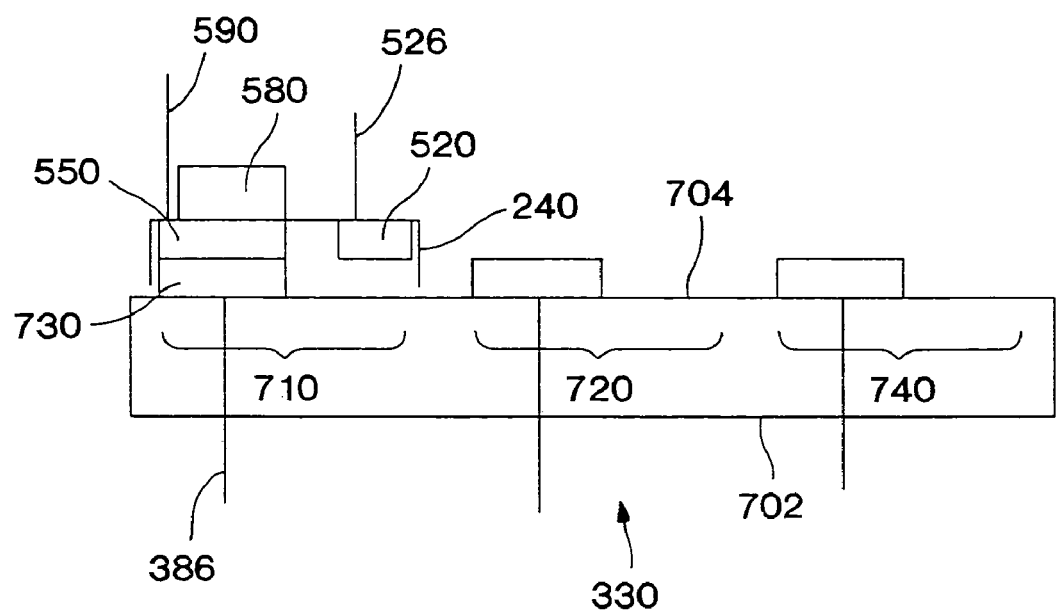
FIG. 7 shows a top view of the gripper mechanism disposed on Applicants' memory accessor releaseably coupled to a second docking position disposed in the information transfer station disposed in Applicants' data storage and retrieval system.

FIG. 7 shows backplane unit 330 (FIGS. 3A, 3B, 3C). Backplane unit 330 is disposed in one or more of the information transfer slots 196 (FIG. 1) disposed in information transfer station 190 (FIG. 1). Backplane 330 includes first side 702 and second side 704. Backplane 330 is disposed in an information transfer slot such that second side 704 faces second side 194 of information transfer station 190. Backplane unit 330 includes docking position 710, docking position 720, and docking position 740.

Docking position 710 includes information input/output port 730. FIG. 7 shows gripper mechanism 240 positioned such that information input/output device 550 is releaseably coupled to information input/output port 730. The interface between information input/output device 550 and information input/output port 730 is formed as described above.

When gripper mechanism 240 is positioned such that information input/output device 550 is releaseably coupled to information input/output port 730, information can be exchanged between host computer 390 (FIGS. 3A, 3B, 3C)

and memory device 580 (FIG. 5)/350 (FIGS. 3A, 3B, 3C) via communication link 386 (FIG. 3), information input/output port 730, information input/output device 550, and optionally, communication link 590 and memory device 350.

Figure 8:
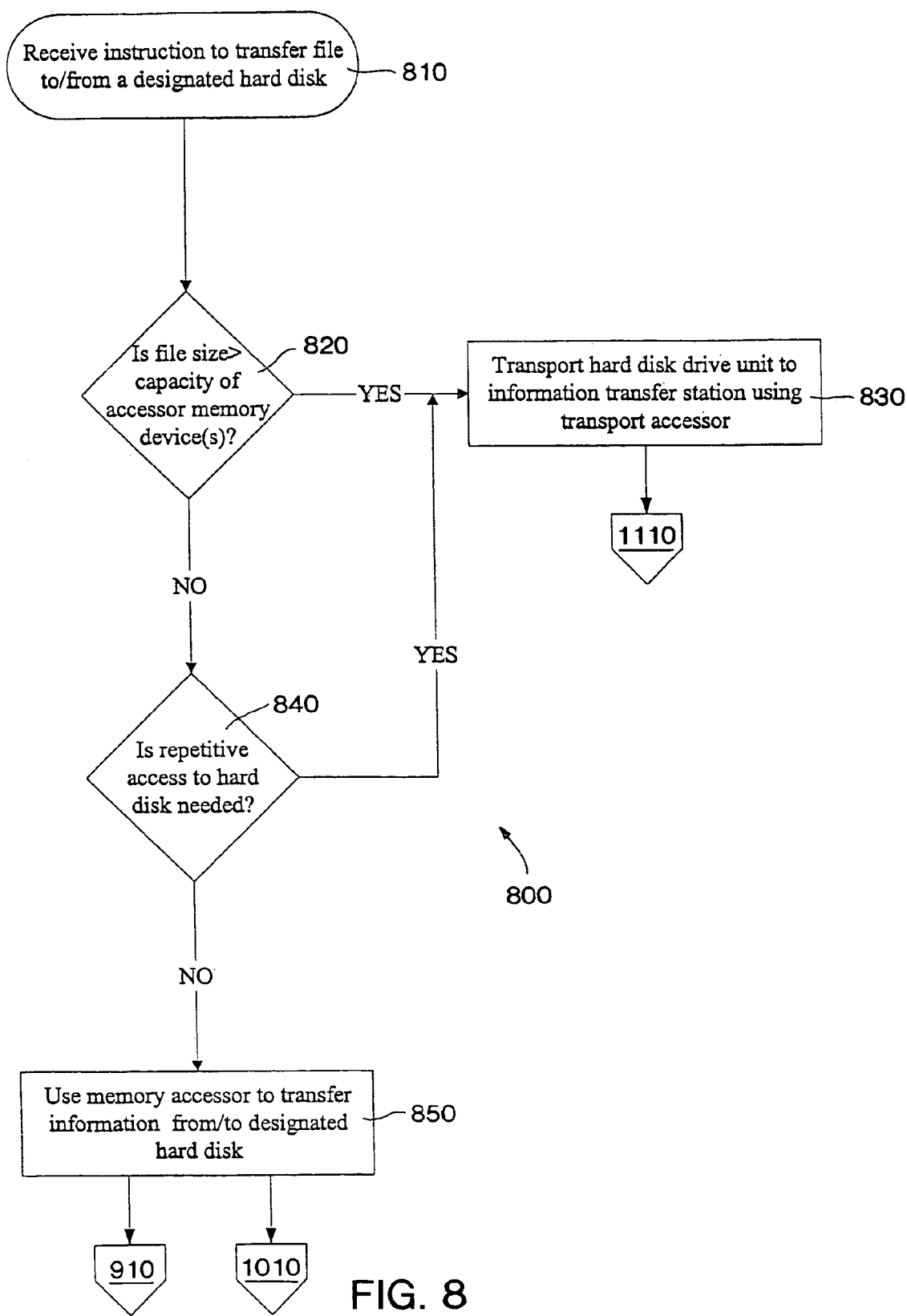
FIG. 8 is a flowchart summarizing the initial steps in Applicants' method to transfer information between a host computer and a hard disk disposed in a hard disk drive unit removeably disposed in a storage slot disposed in Applicants' data storage and retrieval system.

FIG. 8 comprises flow chart 800 which summarizes the initial steps in Applicants' method to exchange information between one or more designated hard disks disposed in Applicants' information storage and retrieval system and a host computer. In step 810, the library controller 104 (FIG. 1), in the embodiments wherein Applicants' data storage and retrieval includes a library controller, or accessor control card 250 (FIGS. 2, 3A, 3B, 3C), in those embodiments of Applicants' data storage and retrieval system which utilize a distributed control network, receives an instruction from host computer 390 (FIGS. 3A, 3B, 3C) to transfer information to and/or from one or more designated hard disks stored in Applicants' system. In step 820, controller 104/control card 250 determines if the file size of the requested information exceeds the capacity of memory device 350 (FIGS. 3A, 3B, 3C) and/or memory device 580 (FIG. 5).

In the event the file size exceeds the storage capacity of memory device 350 and/or memory device 580, then in step 830 controller 104/control card 250 instructs a transport accessor, such as accessor 102 or 104, to retrieve the hard disk drive unit containing the designated hard disk drive, and to transport that hard disk drive unit to information transfer station 190 (FIG. 1). Applicants' method then loops to step 1110.

In the event the amount of information to be transferred does not exceed the storage capacity of memory device(s) 350/580, then in step 840 controller 104/control card 250 determines whether the request from host computer 390 will require repetitive access to the designated hard disk. In the event such repetitive access is required, then in step 830 controller 104/control card 250 instructs a transport accessor, such as accessor 102 or 104, to retrieve the hard disk drive unit containing the designated hard disk drive, and to transport that hard disk drive unit to information transfer station 190 (FIG. 1). Applicants' method then loops to step 1110.

Figure 11:
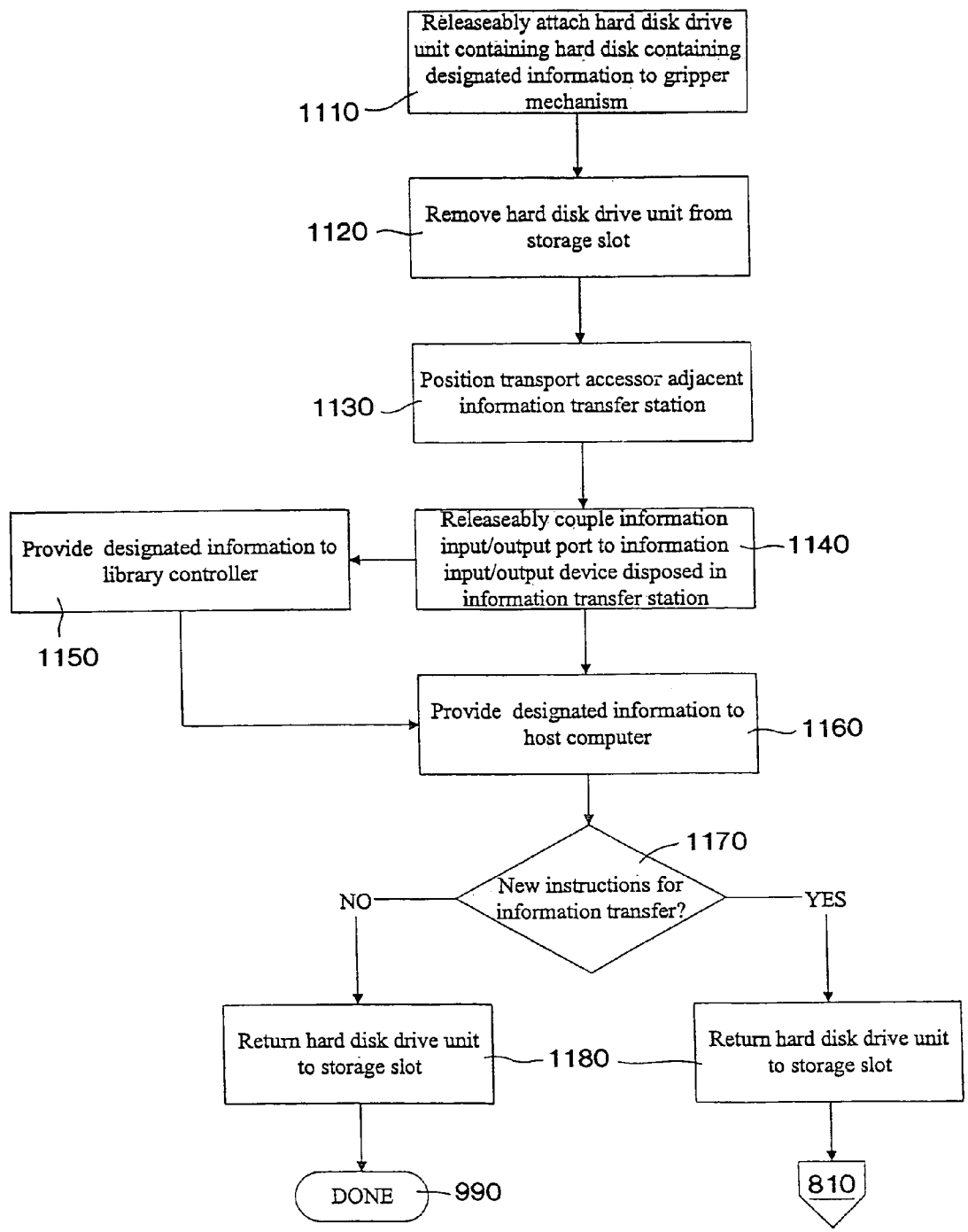
FIG. 11 is a flowchart summarizing additional steps in Applicants' method to transfer information between a host computer and a hard disk disposed in a hard disk drive unit removeably disposed in a storage slot disposed in Applicants' data storage and retrieval system.

Referring now to FIG. 11, in step 1110, gripper mechanism 230 (FIG. 2) releaseably attaches to the hard disk drive unit, such as hard disk drive unit 410 (FIG. 4), containing the hard disk which contains the designated information, such as hard disk 415. In step 1120, the transport accessor removes that releaseably-attached hard disk drive unit from its storage slot, such as storage slot 460 (FIG. 4). In step 1130, the accessor and the releaseably attached hard disk drive unit are positioned adjacent information transfer station 190 (FIG. 1). In step 1140 the information input/output port disposed on the hard disk drive unit, such as information input/output port 630 (FIG. 6), is releaseably coupled to an information input/output device, such as information input/output device 650 (FIG. 6), disposed in information transfer station 190 (FIG. 1).

By releaseably coupling information input/output port disposed on the hard disk drive unit to an information input/output device disposed in the information transfer station, the power connector, such as power supply connector 620 (FIG. 6), associated with the information input/output device releaseably connects to the power port, such as power port 610 (FIG. 6), disposed on the hard disk drive unit. In step 1160, the designated information is provided to one or more host computer(s), such as host computer 390 (FIGS. 3A, 3B, 3C). In certain embodiments, the designated information is provided to host computer 390 directly from the designated hard disk. In alternative embodiments and in accord with step 1150, the designated information is first provided to controller 104. Subsequently, that designated information is provided by controller 104 to host computer 390 in step 1160.

In step 1170, controller 104/control card 250 ascertains whether host computer 390 has new instructions for information transfer to/from one or more newly-designated hard disks disposed in Applicants' system. In the event host computer 390 provides no further information transfer requests, then the presently-designated hard disk is returned to its designated storage slot in step 1180, and Applicants' method transitions to step 990 and ends.

In the event, however, host computer 390 provides one or more new information transfer request(s), the presently-designated hard disk drive unit is returned to its storage slot in step 1180, and Applicants' method transitions to step 810 (FIG. 8) to handle the newly-received information transfer request(s).

Figure 12:
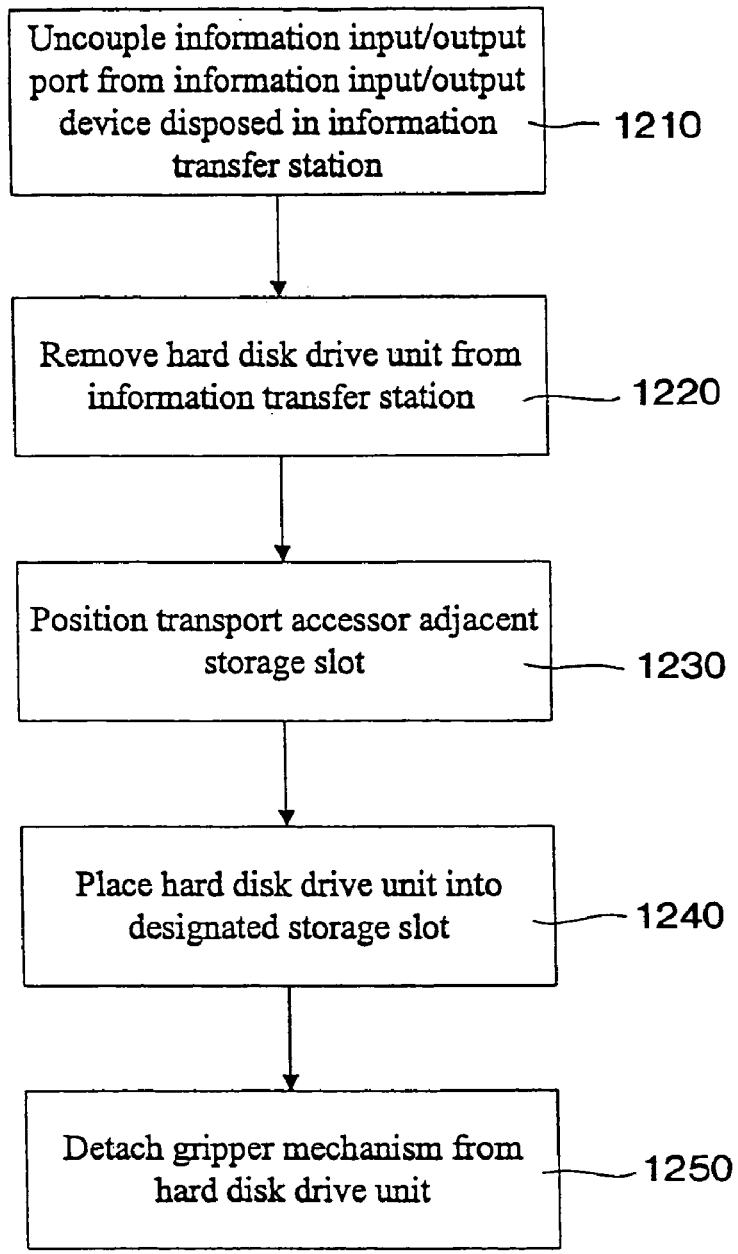
FIG. 12 is a flowchart summarizing additional steps in Applicants' method to transfer information between a host computer and a hard disk disposed in a hard disk drive unit removeably disposed in a storage slot disposed in Applicants' data storage and retrieval system.

Return of the presently-designated hard disk drive unit, such as hard disk 410 (FIGS. 4, 6) from docking position 660 (FIG. 6) disposed in information transfer station 190 (FIG. 1) to its designated storage slot, such as storage slot 460 (FIG. 4), comprises a number of individual steps. FIG. 12 summarizes those individual steps comprising step 1180 (FIG. 11).

Referring now to FIG. 12, in step 1210 information input/output port 630 (FIG. 6) and power port 610 (FIG. 6) are uncoupled from information input/output device 650 (FIG. 6) and from power supply device 620 (FIG. 6), respectively, by retracting gripper mechanism 230 (FIGS. 2, 4), disposed on the transport accessor, such as accessor 110 (FIGS. 1, 2), in the −Y direction. In step 1220, gripper mechanism 230 is moved in the −Y direction sufficiently to remove hard disk drive unit 410 from information transfer station 190.

In step 1230, transport accessor and the releaseably-attached hard disk drive unit are moved in the −X direction along rail system 130 (FIG. 1), and lifting servo section 220 (FIG. 2) is moved in the Z direction, such that hard disk drive unit 410 is positioned adjacent its designated storage slot, such as storage slot 460 (FIG. 4). In step 1240, gripper mechanism 230 is moved in the +Y direction to place hard disk drive unit 440 into storage slot 490. In step 1250, the distal end of arm 454 (FIG. 4) is moved in the +X direction, and the distal end of arm 456 (FIG. 4) is moved in the −X direction, to release hard disk drive unit 410 from gripper mechanism 230.

Referring again to FIG. 8, in the event that repetitive access to the designated hard disk is not required, and in the event the amount of information to be transferred does not exceed the storage capacity of memory device(s) 350/580, then in step 850 controller 104/accessor control card 250 instructs memory accessor 140 or 150 to transfer the designated information between data transfer station 190 and the designated hard disk drive using memory device(s) 350/580.

In the event the designated information is to be provided from host computer 390 (FIGS. 3A, 3B, 3C) and stored on one or more designated hard disks using memory devices/350/580, then Applicants' method loops to step 910. In the event the designated information is to be transferred from one or more designated hard disk(s), such as hard disk 445, to host computer 390 (FIGS. 3A, 3B, 3C), then Applicants' method loops to step 1010.

Figure 9:
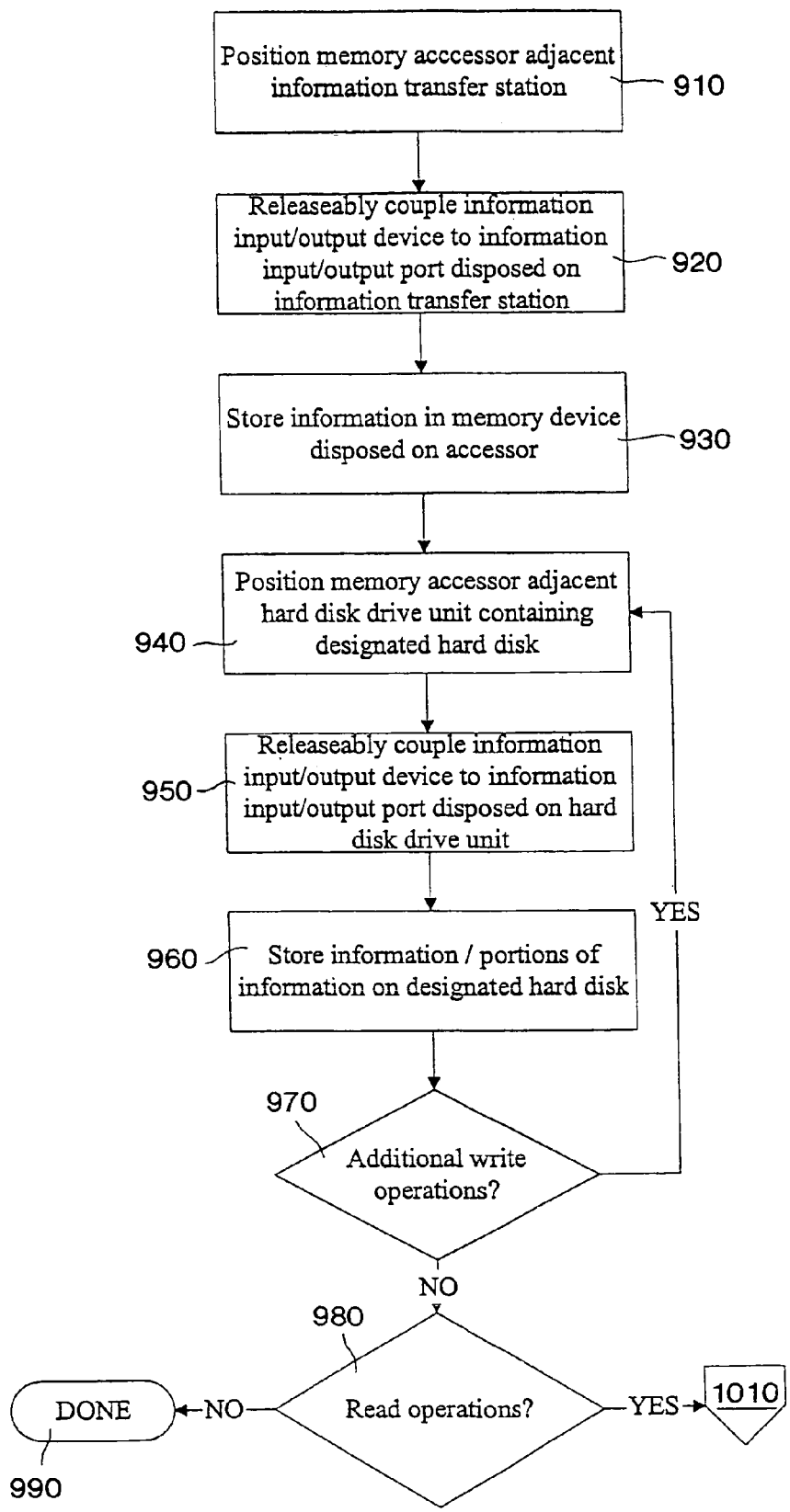
FIG. 9 is a flowchart summarizing additional steps in Applicants' method to transfer information between a host computer and a hard disk disposed in a hard disk drive unit removeably disposed in a storage slot disposed in Applicants' data storage and retrieval system.

Referring to FIG. 9, in step 910 a memory accessor, such as accessor 140 (FIG. 1) or 150 (FIG. 1), is positioned adjacent information transfer station 190 (FIG. 1). In step 920, lifting servo section 220 (FIG. 2) is positioned in the Z direction, and gripper mechanism 240 (FIGS. 2, 5, 7) is positioned in the Y direction, such that information input/output device 550 (FIGS. 5, 7) disposed on gripper mechanism 240 is releaseably coupled to information input/output port 730 (FIG. 7) disposed on backplane 330 (FIGS. 3A, 3B, 3C, 7) disposed in data transfer station 190 (FIG. 1). In step 930, the designated information is downloaded from host computer 390 (FIGS. 3A, 3B, 3C) to memory device 350 (FIGS. 3A, 3B, 3C) and/or memory device 580 (FIGS. 5, 7).

In step 940 the memory accessor is positioned adjacent the storage slot, such as storage slot 490 (FIG. 4), wherein the hard disk drive unit, such as hard disk drive unit 440 (FIG. 4), which contains the designated hard disk, such as hard disk 445 (not shown in FIGS.), is disposed. In step 950 lifting servo section 220 (FIG. 2) is positioned in the Z direction, and gripper mechanism 240 (FIGS. 2, 5, 7) is positioned in the Y direction, such that information input/output device 550 (FIGS. 5, 7) disposed on gripper mechanism 240 is releaseably coupled to information input/output port 530 (FIG. 5) disposed on hard disk drive unit 440 (FIGS. 4, 5), and such that power supply connector 520 (FIG. 5) disposed on gripper mechanism 240 is releaseably connected to power port 510 (FIG. 5) disposed on hard disk drive unit 440, while hard disk drive unit 440 remains disposed in storage slot 490 (FIG. 4). In step 960, the designated information is transferred from memory device 350 (FIGS. 3A, 3B, 3C)/memory device 580 (FIGS. 5, 7) to hard disk 445.

In the event the same designated information is to be stored on more than one hard disk, such as where a mirrored redundant array of independent disk ("RAID") protocol, called RAID-1, is in use, after transferring the designated information to a first hard disk, the memory accessor can transfer that same designated information to one or more backup hard disks disposed in additional hard disk drive units. In the event such a RAID protocol is in use, then in step 970 library controller 104/control card 250 determines that additional write operations are required. Applicants' method then loops to step 940, and steps 940 through 960 are repeated one or more times such that the designated information is stored on one or more backup hard disks. Alternatively, the information may be striped across a plurality of disks with parity on one hard disk, called RAID-4, or with distributed parity, which is called RAID-5.

In the event portions of the designated information are to be provided to more than one hard disk, then in step 960 a first portion of the designated information is provided to a first hard disk. In step 970 Applicants' method then loops back to step 940 and repeats steps 940 through 960 one or more times to store additional portions of the designated information on additional hard disk(s) disposed within Applicants' system.

In the event the host computer requests certain information be written to one or more hard disks, and also requests that different information be provided by the same or a different hard disk(s), then after all write operations have been completed, in step 980 Applicants' method loops to step 1010.

Figure 10:
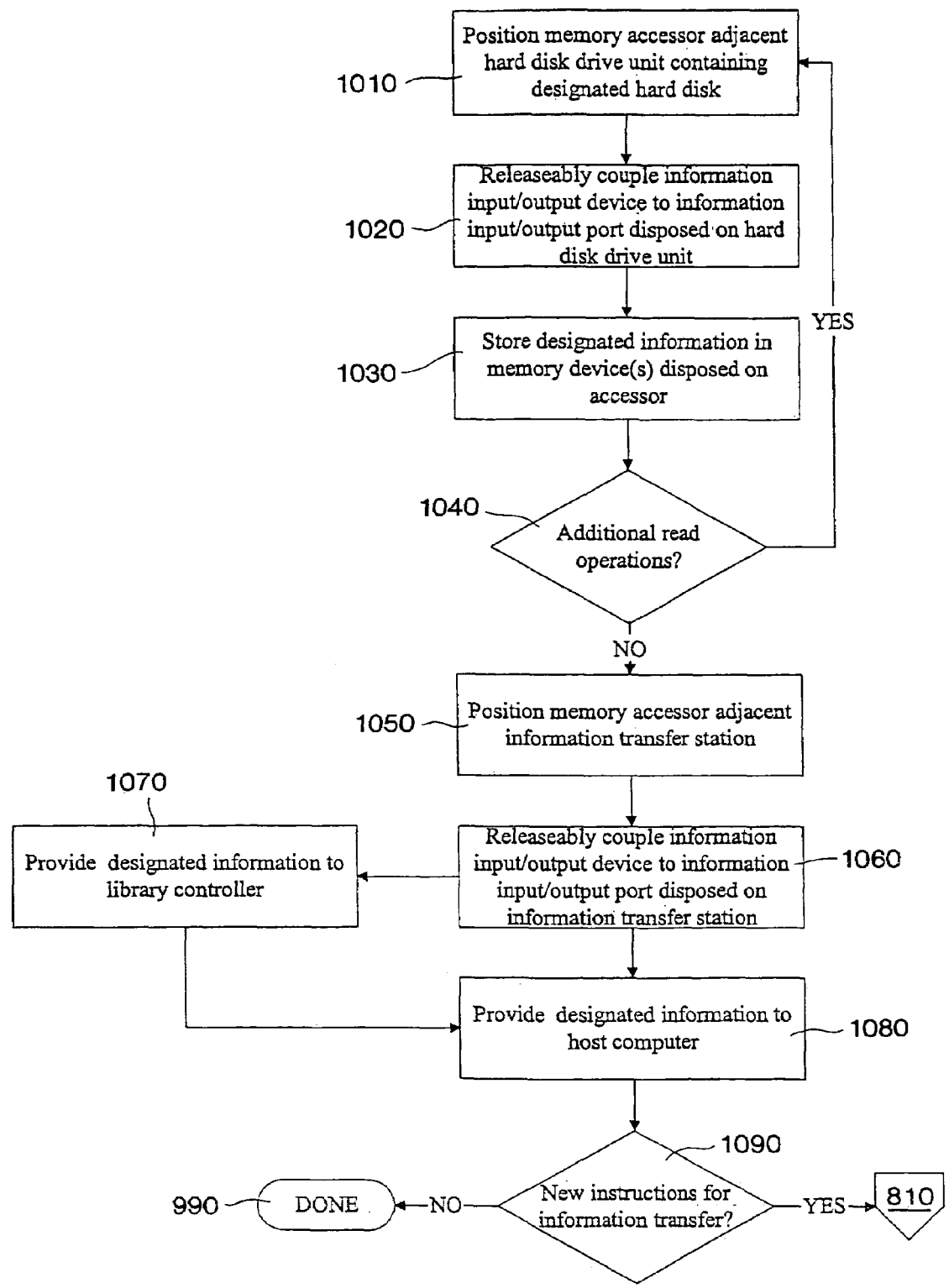
FIG. 10 is a flowchart summarizing additional steps in Applicants' method to transfer information between a host computer and a hard disk disposed in a hard disk drive unit removeably disposed in a storage slot disposed in Applicants' data storage and retrieval system.

Referring now to FIG. 10, in step 1010 a memory accessor, such as accessor 140 (FIG. 1) or accessor 150 (FIG. 1) is positioned adjacent the storage slot, such as storage slot 490 (FIG. 4) containing the hard disk drive unit, such as hard disk drive unit 440 (FIGS. 4, 5), which includes the hard disk, such as hard disk 445, which contains all or part of the requested information.

In step 1020, gripper mechanism 240 (FIGS. 2, 5, 7) is positioned such that information input/output device 550 (FIG. 5) is releaseably coupled to information input/output port 530 (FIG. 3), and such that power connector 520 (FIG. 5) is releaseably connected to power port 510 (FIG. 5). In step 1030, the requested information is downloaded from hard disk 445 to memory device(s) 350 (FIGS. 3A, 3B, 3C)/580 (FIG. 5). This may entail writing over information from step 930 (FIG. 9), which is allowed because that information was already safely stored to the destination hard disk in step 960.

In step 1040, library controller 104/control card 250 determines if host computer 390 (FIG. 3) has requested additional read operations. In the event the host computer requires additional information be provided from one or more additional designated hard disks, then Applicants' method loops to step 1010 and repeats steps 1010 through 1030 until all the designated information from each of the designated hard disks has been stored in memory device(s) 350/580.

After all read operations have been completed, in step 1050 the memory accessor is positioned along rail system 160 adjacent information transfer station 190 (FIG. 1). In step 1060, lifting servo section 220 (FIG. 2) and gripper mechanism 240 are positioned such that information input/output device 550 (FIGS. 5, 7) is releaseably coupled to an information input/output, such as information input/output port 730 (FIG. 7), disposed on a docking position, such as docking position 710 (FIG. 7), disposed on a backplane unit, such as backplane unit 330, accessible from side 194 (FIG. 1) of information transfer station 190 (FIG. 1). In step 1080, the designated information is provided to host computer 390 (FIGS. 3A, 3B, 3C).

In certain embodiments, the designated information is provided to host computer 390 directly from the memory device(s) disposed on the memory accessor. In alternative embodiments and in accord with step 1070, the designated information is first provided to controller 104 (FIG. 1). Subsequently, that designated information is provided by controller 104 to host computer 390 in step 1080.

In step 1090, controller 104/control card 250 ascertains whether host computer 390 has new instructions for information transfer to/from one or more newly-designated hard disks disposed in Applicants' system. In the event host computer 390 provides no further information transfer requests, then Applicants' method transitions from step 1090 to step 990 and ends. In the event, however, host computer 390 provides one or more new information transfer request(s), then Applicants' method transitions to step 810 (FIG. 8) to handle the newly-received information transfer request(s).

Applicants' invention includes a data storage and retrieval system comprising a computer useable medium having computer readable program code disposed therein for implementing Applicants' method discussed above to transfer designated information between one or more host computer(s) and one or more hard disks disposed in one or more hard disk drive units removeably disposed within Applicants' data storage and retrieval system. The programming of the present invention may comprise a computer program product embodied as program code stored in a storage device, such as a magnetic disk drive or memory, etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. An accessor moveably disposed within a data storage and retrieval system, wherein said data storage and retrieval system includes one or more storage slots and a hard disk drive unit removeably disposed in one of said one or more storage slots, wherein said hard disk drive unit comprises a hard disk, a read/write head, and an information input/output port in communication with said read/write head, said accessor comprising:
   a carriage assembly moveably disposed on a rail system;
   a vertical pillar extending upwardly from said carriage assembly;
   a lifting servo section moveably disposed on said vertical pillar;
   a first memory device disposed on said lifting servo section;
   an information input/output device connected to first said memory device, wherein said information input/output device can be releaseably coupled to said information input/output port such that information can be exchanged between said hard disk and said first memory device.

2. The accessor of claim 1, wherein said data storage and retrieval system further comprises a power source, and wherein hard disk drive unit further comprises a power port, said accessor further comprising:
   a power supply connector connected to said power source;
   wherein said power supply connector can be releaseably connected to said power port such that said power source supplies power to said hard disk drive unit.

3. The accessor of claim 2, further comprising:
   a gripper mechanism;
   wherein said information input/output device is disposed on said gripper mechanism, and wherein said power connector is disposed on said gripper mechanism.

4. The accessor of claim 3, further comprising a wireless communication device.

5. The accessor of claim 3, wherein said first memory device is disposed on said gripper mechanism.

6. The accessor of claim 5, further comprising an accessor control card.

7. The accessor of claim 6, further comprising a second memory device in communication with said information input/output device, wherein said second memory device is disposed on said accessor control card.

8. A data storage and retrieval system, comprising:
   a host computer;
   a backplane unit comprising a first information input/output port, wherein said first information input/output port is in communication with said host computer;
   one or more storage slots;
   one or more hard disk drive units removeably disposed in said one or more storage slots, wherein each of said one or more hard disk drive units comprises a hard disk, a read/write head, and a second information input/output port, wherein said read/write head is in communication with said second input/output port;
   one or more accessors moveably disposed within said data storage and retrieval system, wherein each of said accessors includes a carriage assembly moveably disposed on a rail system, a vertical pillar extending upwardly from said carriage assembly, a lifting servo section moveably disposed on said vertical pillar, a first memory device disposed on said lifting servo section, and an information input/output device, wherein said first memory device is in communication with said information input/output device;
   wherein said information input/output device can be releaseably coupled to said first information input/output port; and
   wherein said information input/output device can be releaseably coupled to said second information input/output port.

9. The data storage and retrieval system of claim 8, further comprising a library controller.

10. The data storage and retrieval system of claim 8, further comprising a distributed control network.

11. The data storage and retrieval system of claim 10, wherein each of said one or more accessors further comprises an accessor control card.

12. The data storage and retrieval system of claim 11, wherein one or more of said one or more accessors further comprises a second memory device in communication with said information input/output device, wherein said second memory device is disposed on said accessor control card.

13. The data storage and retrieval system of claim 8 further comprising an information transfer station, wherein said backplane unit is disposed in said information transfer station.

* * * * *